(12) United States Patent
Kostadinov

(10) Patent No.: US 9,843,449 B2
(45) Date of Patent: Dec. 12, 2017

(54) SECURE DEVICE COMMUNICATION

(71) Applicant: Dresser, Inc., Houston, TX (US)

(72) Inventor: Vladimir Dimitrov Kostadinov, Sharon, MA (US)

(73) Assignee: Dresser, Inc., Addison, TX (US)

( * ) Notice: Subject to any disclaimer, the term of this patent is extended or adjusted under 35 U.S.C. 154(b) by 0 days.

(21) Appl. No.: 14/734,248

(22) Filed: Jun. 9, 2015

(65) Prior Publication Data

US 2016/0366131 A1    Dec. 15, 2016

(51) Int. Cl.
*H04L 29/06* (2006.01)
*H04L 9/32* (2006.01)

(52) U.S. Cl.
CPC ........ *H04L 9/3247* (2013.01); *H04L 63/0428* (2013.01); *H04L 63/1433* (2013.01); *H04L 63/0281* (2013.01)

(58) Field of Classification Search
CPC .. H04L 9/3247; H04L 63/0876; H04L 63/061
See application file for complete search history.

(56) References Cited

U.S. PATENT DOCUMENTS

| | | | |
|---|---|---|---|
| 6,907,082 B1 | 6/2005 | Loechner | |
| 6,959,356 B2 | 10/2005 | Packwood et al. | |
| 7,218,613 B1 * | 5/2007 | Doskow | H04L 12/2602 370/252 |
| 7,684,784 B2 | 3/2010 | Parthasarathy | |
| 8,190,916 B1 * | 5/2012 | Wang | G06F 21/575 713/193 |
| 2004/0255145 A1 * | 12/2004 | Chow | G06F 12/1466 726/16 |

(Continued)

FOREIGN PATENT DOCUMENTS

| | | |
|---|---|---|
| EP | 1640836 A1 | 3/2006 |
| EP | 2461538 A2 | 6/2012 |

OTHER PUBLICATIONS

Musaria K. Mahmood and Fawzi M. Al-Naima, "Developing a Multi-Layer Strategy for Securing Control Systems of Oil Refineries," Scientific Research, Wireless Sensor Network, May 12, 2010, 2, 520-527.

(Continued)

*Primary Examiner* — Dao Ho
(74) *Attorney, Agent, or Firm* — Paul Frank + Collins P.C.

(57) ABSTRACT

A system and associated method for securing communication between a first device and a second device are provided. The system includes a first device communicatively coupled with a second device over a communication connection line. The system includes a security transformation device coupled to the communication connection line. The security transformation device is configured to transform non-secure communication into secure communication to send over the communication connection line to a destination. The security transformation device is configured to evaluate communication using security evaluation functionality by either authenticating or failing to authenticate the communication. If the communication is successfully authenticated, then the communication is provided to a destination, otherwise, the communication is not provided to the destination.

13 Claims, 16 Drawing Sheets

(56) References Cited

U.S. PATENT DOCUMENTS

2013/0061034 A1\* 3/2013 Walheim, Sr. ...... H04L 63/0272
 713/150
2013/0266043 A1\* 10/2013 Young .................. H03M 13/09
 375/144

OTHER PUBLICATIONS

Wonderware Invensys Systems, Inc. Securing Industrial Control Systems-A guide for properly securing Industrial Control Systems operating in a Microsoft Windows environment. Dec. 4, 2007, p. 143.

Oman et al., "Safeguarding IEDS, Substations, and SCADA Systems Against Electronic Intrusions," 3rd Annual Western Power Delivery Automation Conference, Apr. 2001.

International Search Report of the International Search Authority for corresponding PCT Application No. 2016/032244 dated Sep. 22, 2016.

Written Opinion of the International Search Authority for corresponding PCT Application No. 2016/032244 dated Sep. 22, 2016.

\* cited by examiner

SECURE DEVICE COMMUNICATION

BACKGROUND

Many industries, such as an oil industry, a nuclear power industry, etc., employ devices that can be susceptible to security threats. In an example, the oil industry may have numerous pipelines spanning hundreds of miles between an oil source and a refinery that has a multitude of various devices (e.g., valves, temperature sensors, actuators, oil refining equipment, etc.) used as part of an oil refining/distribution process. A malicious person may be capable of accessing a communication connection line, used to send control signals to and/or collect data from devices, spanning a pipeline without being detected. The malicious person could inject commands into the communication connection line that may alter normal operation of devices along the pipeline and/or within the refinery (e.g., closing a valve that should be open, sending an incorrect temperate to a device, obtaining access to a distributed control system, inserting a script into a host database, crashing a device such as a host device, etc.). In this way, an industry may be susceptible to security threats because the industry may employ thousands of unsecure devices that may be at locations that are not monitored for security. Thus, it would be useful to provide a security transformation device (e.g., a security conversion device) that can provide secure communication between a device and a distributed control system, thus (1) increasing security by encrypting or digitally signing communication; (2) lowering costs (e.g., increase security without replacing thousands of unsecure devices with secure devices); and/or (3) providing security without modifying existing communication protocols. Thus there are needs for continued improvement accordingly.

BRIEF DESCRIPTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The disclosed subject matter generally relates to secure device communication, and more particularly relates to facilitating secure communication between two devices, such as between a distributed control system and an industrial field device or between different industrial field devices connected on the same communication line.

In accordance with one aspect, the disclosed subject matter provides a system for securing communication between a first device and a second device. The system includes a first device communicatively coupled with a second device over a communication connection line. The system includes a security transformation device coupled to the communication connection line. The security transformation device is configured to receive non-secure communication for transmission over the communication connection line. The security transformation device is configured to transform the non-secure communication into secure communication. The security transformation device is configured to send the secure communication to a destination. The destination includes the first device, the second device, or another security transformation device.

In accordance with another aspect, the disclosed subject matter provides a security transformation device. The security transformation device includes a communication connection line interface configured to communicatively couple to a communication connection line that communicatively couples a first device to a second device. The security transformation device includes an interface configured to communicatively couple to a non-secure interface of a component. The component includes the first device or the second device. The security transformation device includes an incoming communication security component. The incoming communication security component is configured to receive communication, through the communication line interface, from over the communication connection line. The incoming communication security component is configured to evaluate the communication utilizing security evaluation functionality by either authenticating the communication or failing to authenticate the communication. Responsive to the security evaluation functionality authenticating the communication, the incoming communication security component is configured to provide the communication over the interface to the component. Responsive to the security evaluation functionality failing to authenticate the communication, the incoming communication security component is configured to refrain from providing the communication to the component or to perform other actions (e.g., corrupt the communication so that the corrupted communication is ignored, mark the communication as having failed authentication, generate and/or provide failed authentication message statistics such as a logged count of failed authentication communication messages, etc.).

In accordance with yet another aspect, the disclosed subject matter provides a method of securing communication between a first device and a second device. The method includes receiving communication over a communication connection line that communicatively couples a second device and a first device. The method includes evaluating the communication utilizing security evaluation functionality by either authenticating the communication or failing to authenticate the communication. The method includes providing the communication to a destination responsive to the security evaluation functionality authenticating the communication. The destination includes the first device or the second device. The method includes refraining from providing the communication to the destination or marking the communication as having failed authentication such as for generation of failed authentication message statistics responsive to the security evaluation functionality failing to authenticate the communication.

BRIEF DESCRIPTION OF THE DRAWINGS

The foregoing and other aspects of the disclosed subject matter will become apparent to those skilled in the art to which the disclosed subject matter relates upon reading the following description with reference to the accompanying drawings, in which.

DETAILED DESCRIPTION

Figure 1:
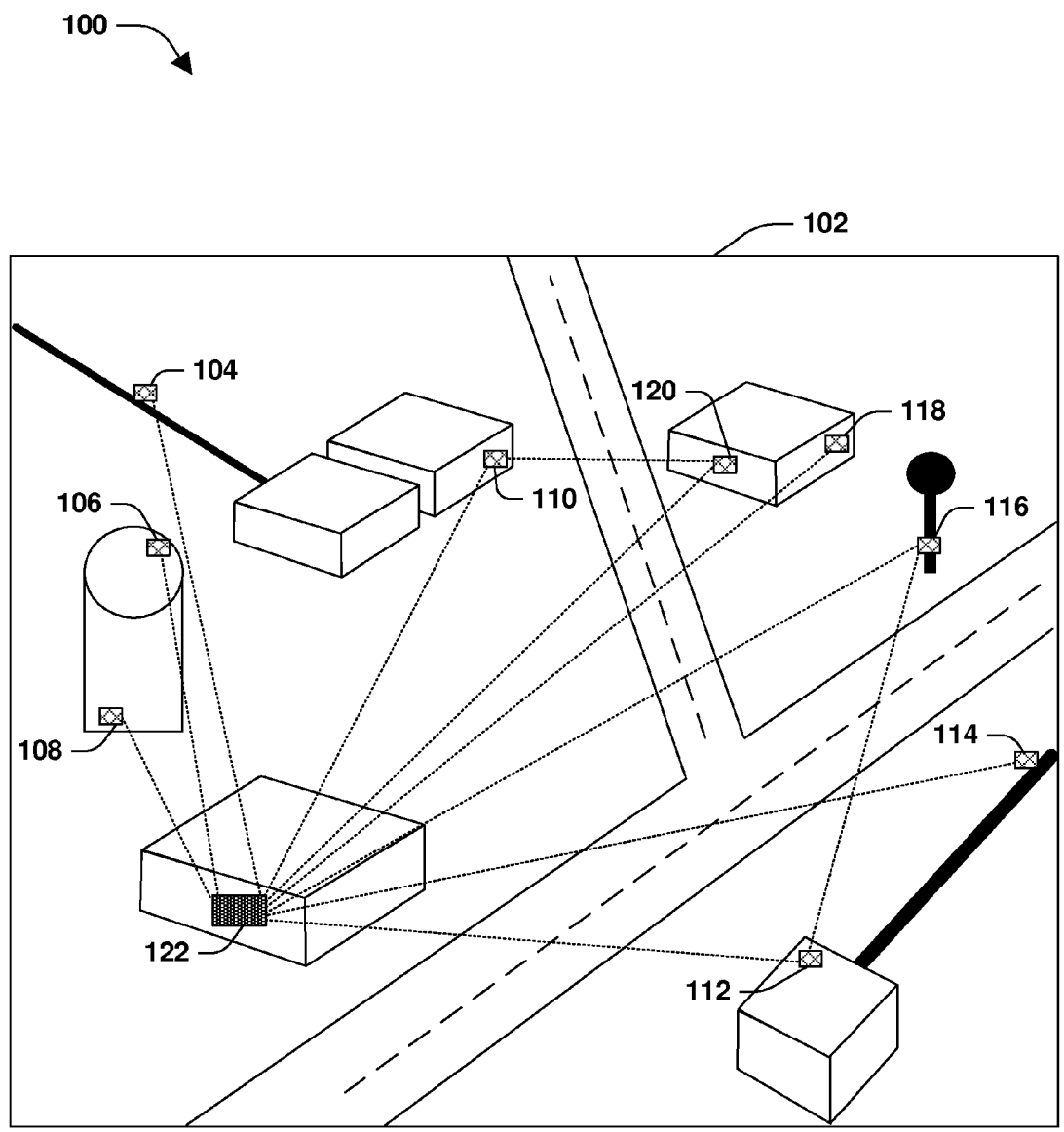
FIG. 1 is a schematic representation of an example of an industrial plant for which secure communication may be provided in accordance with at least one aspect of the disclosed subject matter.

Example embodiments that incorporate one or more aspects of the disclosed subject matter are described and illustrated in the drawings. These illustrated examples are not intended to be a limitation on the disclosed subject matter. For example, one or more aspects of the disclosed subject matter can be utilized in other embodiments and even other types of devices. Moreover, certain terminology is used herein for convenience only and is not to be taken as a limitation on the disclosed subject matter. Still further, in the drawings, the same reference numerals are employed for designating the same elements.

The present disclosure provides techniques for improving security within an industrial setting, such as an industrial plant. For example, a security transformation device may be connected to a communication line between two devices, such as a wire between an industrial device (e.g., a valve used to control the flow of gas through a gas pipeline) and a distributed control system used to manage and control the industrial device. The security transformation device may secure, such as encrypt, messages sent between the industrial device and the distributed control system. The security transformation device may also function as a gatekeeper to improve security by authenticating communication before such communication is provided to the industrial device and/or the distributed control system. For example, if a malicious user attempts to use a device to send a malicious instruction over the communication line to the valve (e.g., the malicious user may connect a device to the communication line, without authorization, in order to send a shut off instruction to the valve in order to disrupt supply of gas through the gas pipeline), the security transformation device may fail to authenticate the malicious instruction and thus may block the malicious instruction from reaching the valve. Other embodiments are within the scope of the disclosed subject matter.

FIG. 1 schematically illustrates an example setting/environment 100 of an industrial plant 102 for which secure communication may be provided in accordance with at least one aspect of the disclosed subject matter. The industrial plant 102 may employ a large multitude of devices, such as valves, actuators, temperature sensors, flow rate monitors, pipe transportation devices, oil refining machinery, and/or other devices that may be communicatively coupled by communication connection lines with a distributed control system 122. For example, the distributed control system 122 may be communicatively coupled to a first device 104 located along a first pipe, a second device 106 and a third device 108 located within a holding tank, a fourth device 110 located within a storage building, a fifth device 112 located within a distribution building, a sixth device 114 located along a second pipe, a seventh device 116 located on a control signal tower, an eighth device 118 and a ninth device 120 located within an oil refining building, and/or other devices. It is to be appreciated that communicatively coupled can be by any suitable construction/configuration such as wired, wireless (e.g., RF broadcast, IR line of sight, optical line of sight), fiber optic, satellite, etc. Devices may be communicatively coupled to other devices, such as the fourth device 110 being connected to the ninth device 120 and the fifth device 112 being connected to the seventh device 116. It may be appreciated that various types of communication and communication connections may be utilized.

The distributed control system 122 may send control signals to and/or collect data from such devices. For example, the distributed control system 122 may receive a temperature measurement from a temperature sensor. In another example, the distributed control system 122 may send a control signal to a gas valve to open to a certain position (e.g., a halfway open condition) based upon the temperature measurement. The control signal may be analog (e.g. 4-20 mA) or digital, such as a Highway Addressable Remote Transducer (HART) protocol, a Foundation fieldbus (FF) protocol, etc.

In an example, the distributed control system 122 may be located in a secure building, but some of the devices may be located in unsecure locations. For example, a temperature sensor located at a position, along the first pipe, that is at a great distance (e.g., multiple miles, not shown within FIG. 1) from the industrial plant 102 or other buildings affiliated with the industrial plant 102. A malicious person may wish to connect a malicious device to a communication connection line communicatively coupling the temperature sensor and the distributed control system 122. The person may try to use the malicious device to provide erroneous temperature measurements, as though they originated from the temperature sensor, to the distributed control system 122. As a result, the distributed control system 122 may alter normal operation of the industrial plant 102 based on the erroneous temperature measurements. Many other examples of attempted malicious conduct and associated malicious devices are possible.

Herein, the term "device," alone, is used as a reference to a proper or known device (e.g., part of the industrial plant 102), whereas the phrase "malicious device" is a specific reference to an unknown/ill-intent device (e.g., brought in/used by the malicious person). As provided herein, a security transformation device may be coupled along a communications connection line, such as being coupled to the distributed control system or being coupled to a device (e.g., the temperature sensor), for providing secure communication between the distributed control system and the device.

FIGS. 2A-2E schematically illustrates examples of a system (e.g., 200, 230, 240, 250 and/or 260) for securing communication between a first device 202 (e.g., a programmable logic controller (PLC), a distributed control system, an industrial device, a field device, a control system, etc.) and at least one other device. It is to be appreciated that for each of FIGS. 2A-2E, the first device 202 may be the distributed control system 122 of FIG. 1, may be a subset of the distributed control system 122 of FIG. 1 or may be a different control system or industrial device such as a field device. Also, the presented system(s) 200, 230, 240, 250 and 260 of FIGS. 2A-2E may be the same, similar or different relative to each other. Further, devices (i.e., proper or known devices) presented within the examples shown in FIGS. 2A-2E, may be the devices in FIG. 1 that are part of the industrial plant 102 and/or may be other, non-shown devices.

Figure 2A:
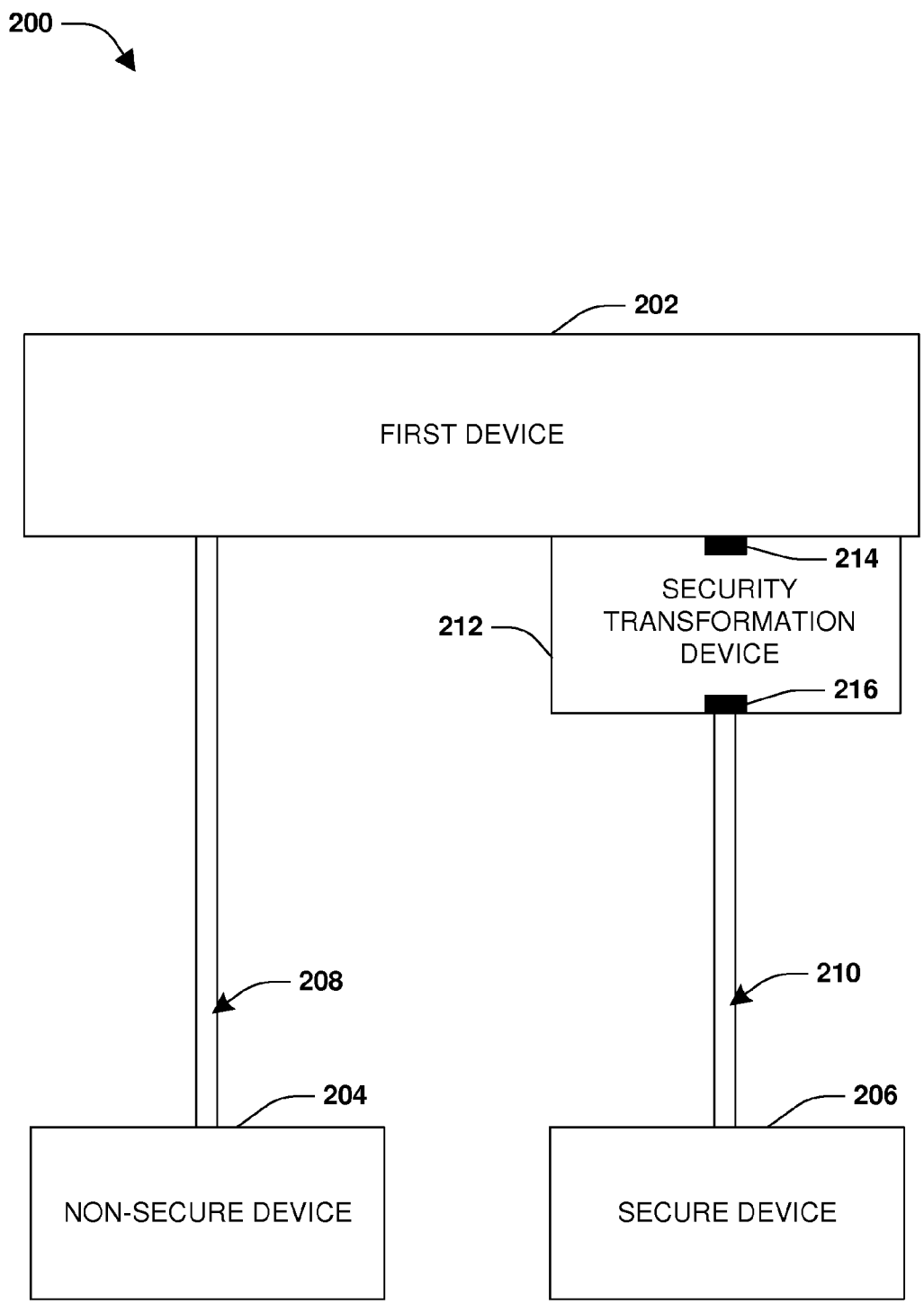
FIG. 2A is a schematic representation of an example of a security transformation device communicatively coupled to a first device.

FIG. 2A illustrates an example system 200 with the first device 202 being communicatively coupled to a non-secure device 204 by a first communication connection line 208 (e.g., wired, wireless, etc.) and to a secure device 206 by a second communication connection line 210 (e.g., wired, wireless, etc.). The secure device 206 may comprise security evaluation functionality, such as a key used to encrypt, decrypt, digitally sign, and/or verify a signature of communication along the second communication connection line 210. In an example, an entire communication message or a portion thereof may be encrypted/digitally signed. In another example, a particular type of communication messages may be encrypted/digitally signed (e.g., a control signal message), while other types may not be encrypted/digitally signed (e.g., a request for a current time).

A security transformation device 212 may be coupled to the second communication connection line 210. For example, the security transformation device 212 may comprise a communication line interface 216 configured to communicatively couple the security transformation device 212 to the second communication connection line 210. In an example, the security transformation device 212 may be incorporated into the first device 202 (or security evaluation functionality may be implemented by the first device 202) or may be coupled to the first device 202. For example, the security transformation device 212 may comprise a first device interface 214 configured to communicatively couple the security transformation device 212 to the first device 202. In this way, the security transformation device 212 may utilize security evaluation functionality, such as using the key for encryption and decryption, to secure communication over the second communication connection line 210 between the first device 202 and the secure device 206. The security transformation device 212 is thus configured to receive non-secure communication for transmission over the communication connection line 210, transform the non-secure communication into secure communication and send the secure communication to a destination. In this case the destination can be the secure device 206.

Figure 2B:
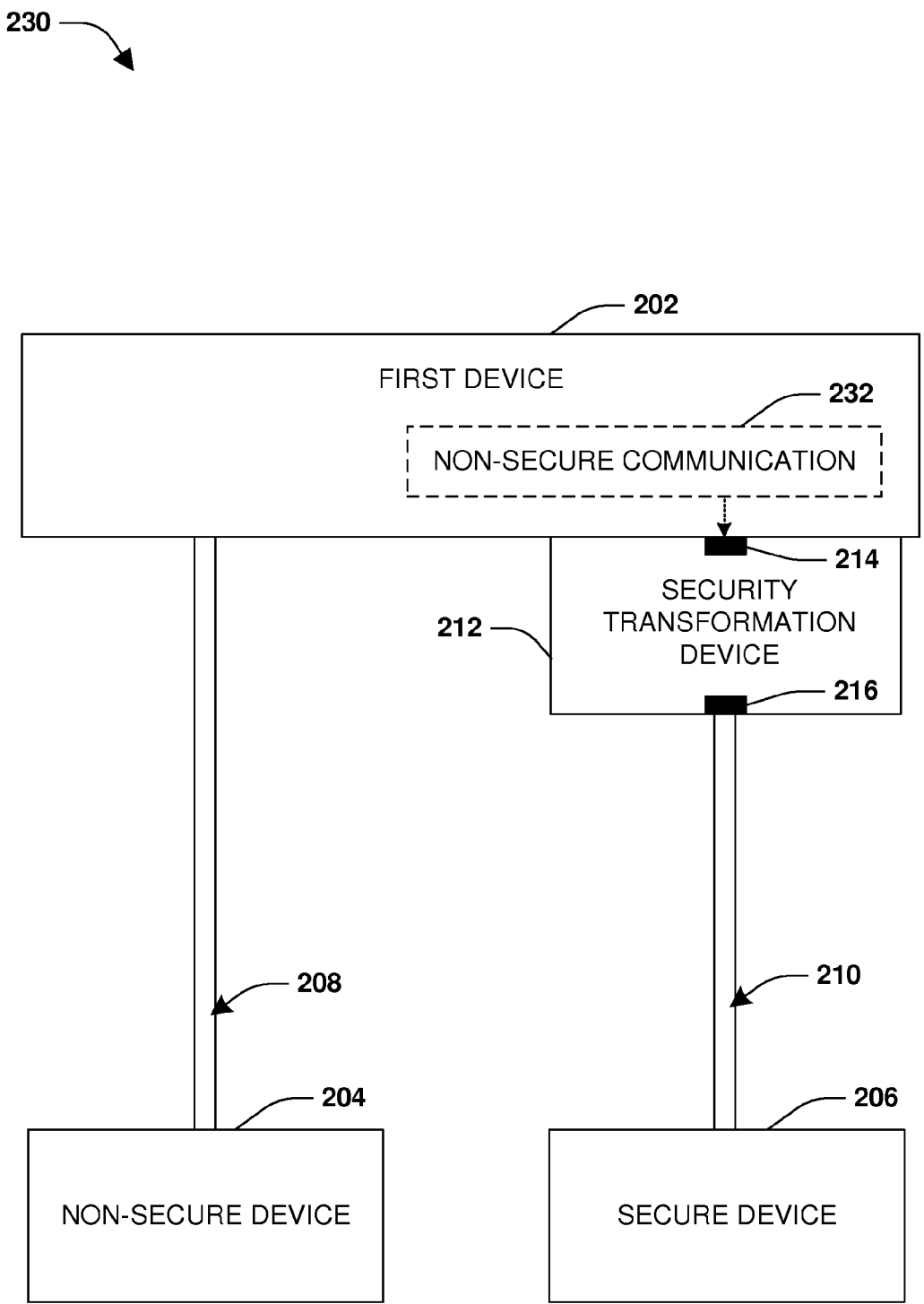
FIG. 2B is a schematic representation of an example of a security transformation device communicatively coupled to a first device, where the security transformation device receives non-secure communication.

FIG. 2B illustrates an example system 230 with the security transformation device 212 receiving non-secure communication 232 from the first device 202. For example, the first device 202 may create the non-secure communication 232, such as a digital signal requesting a temperature measurement from the secure device 206 (e.g., secure communication is a high frequency signal having a frequency much higher than a frequency of a normal control signal sent over the second communication connection line 210), for communication over the second communication connection line 210. The security transformation device 212 may receive the non-secure communication 232 through the first device interface 214.

Figure 2C:
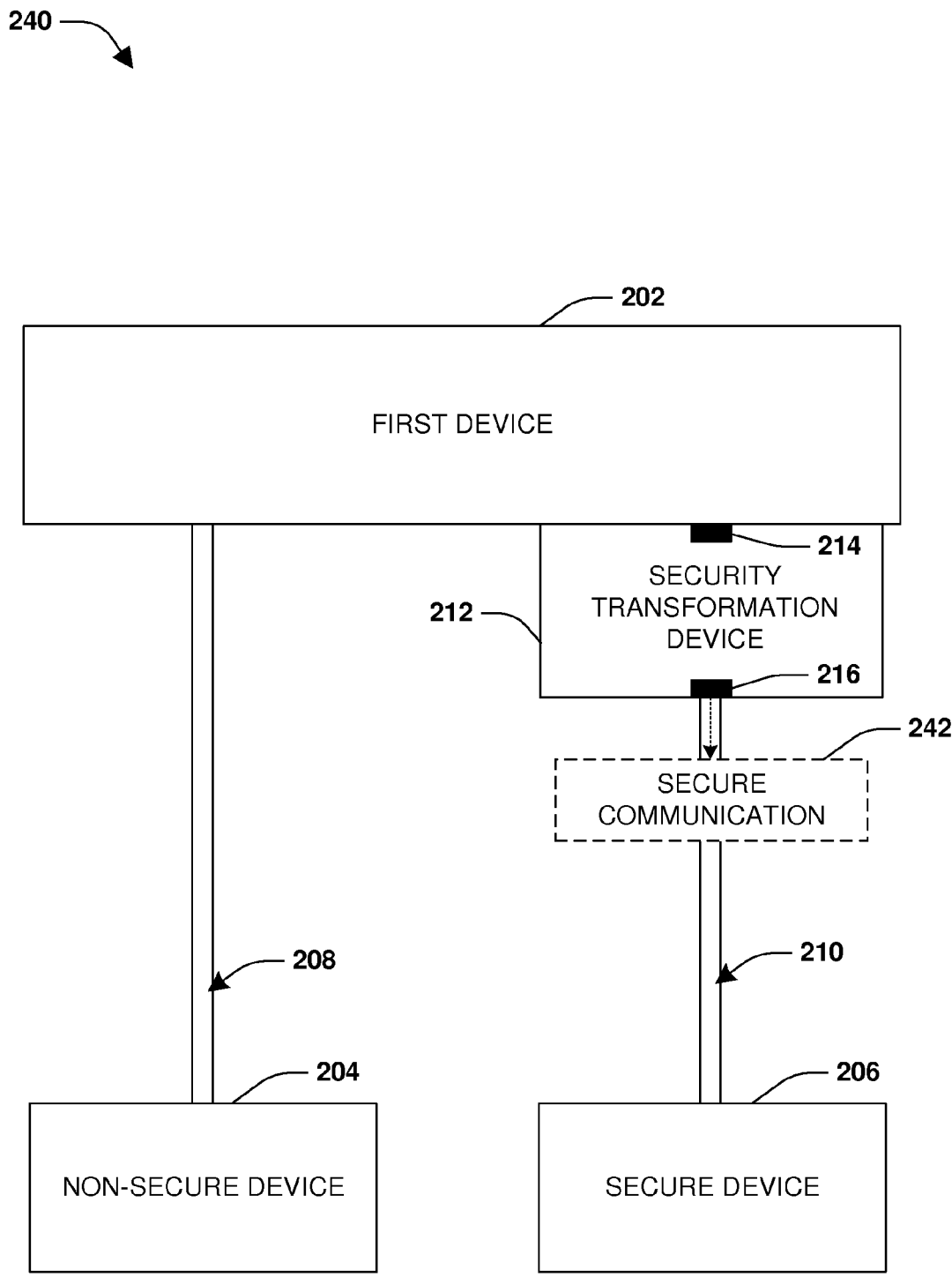
FIG. 2C is a schematic representation of an example of a security transformation device communicatively coupled to a first device, where the security transformation device transforms non-secure communication to secure communication.

FIG. 2C illustrates an example system 240 with the security transformation device 212 transforming the non-secure communication 232 into secure communication 242. For example, the security transformation device 212 may utilize the key to encrypt the non-secure communication 232 to create the secure communication 242. It may be appreciated that various types of encryption may be used, such as hashing (e.g., a unique value is derived from data within a message such that a modification to data of the message may be detected because the modified message now comprises modified data that does not match the unique value), symmetric encryption (e.g., private-key cryptography where both an encryption key and a decryption key are kept private and secure), asymmetric encryption (e.g., public-key cryptography where an encryption key is kept private and secure and a decryption key is publically available), etc. The security transformation device 212 may send the secure communication 242 through the communication line interface 216 and over the second communication connection line 210 to the secure device 206 as a destination for the secure communication 242. In an example of distinguishing between and/or transmitting both controls signals (e.g., utilized by a Highway Addressable Remote Transducer HART protocol) and communication messages over the communication line, the security transformation device 212 may send the secure communication 242 as a digital signal having a relatively higher frequency than frequencies of control signals sent to the secure device 206 (e.g., a high frequency filter may filter the relatively higher frequency so that controls signals are provided to the secure device 206 and the secure communication 242 is provided to security evaluation functionality such as an incoming communication security component of the secure device 206). The secure device 206 may be programmed with a second key that can be used to decrypt the secure communication 242 so that the secure device 206 can access the non-secure communication 232, such as the request for the temperature measurement.

Figure 2D:
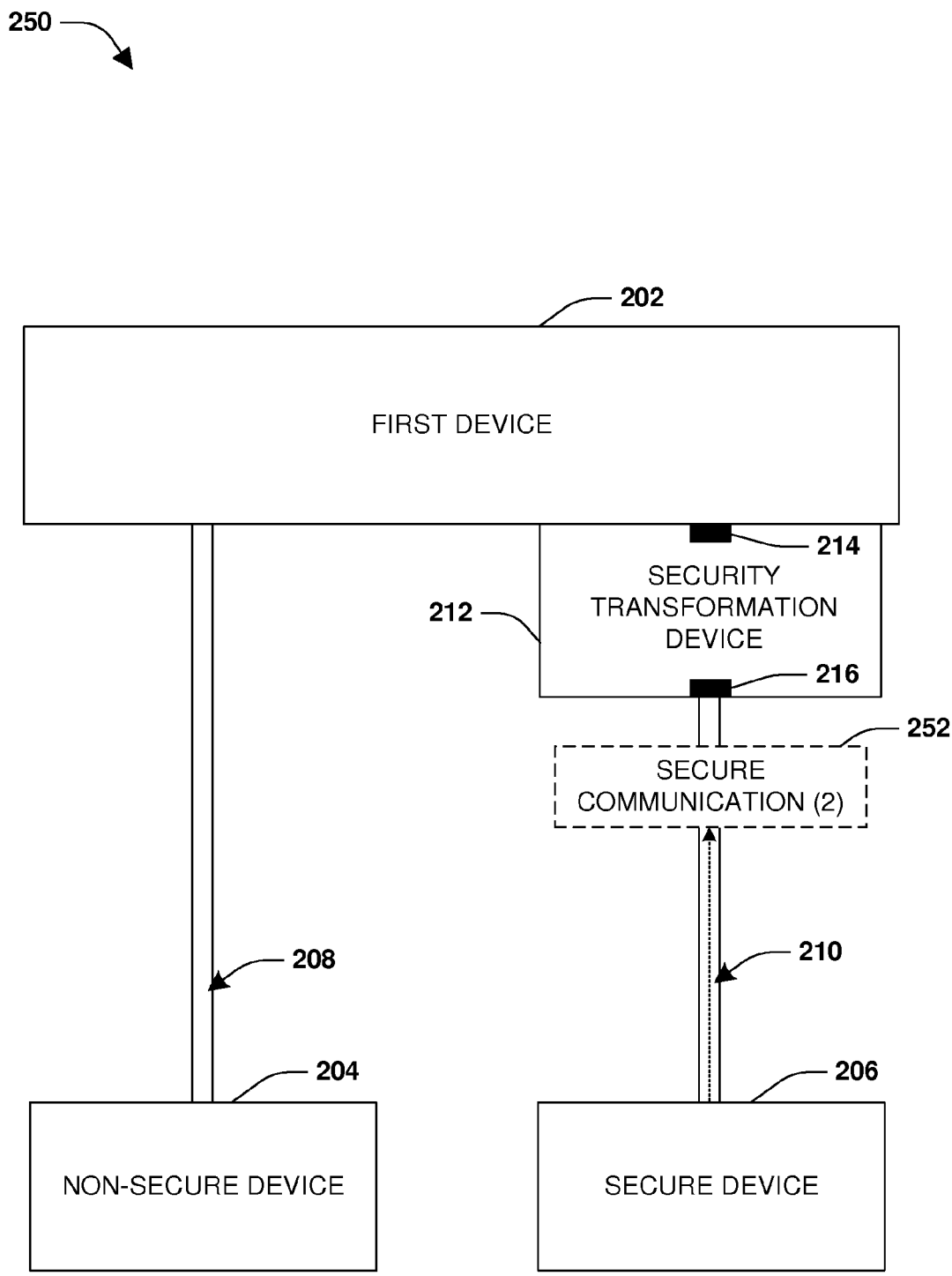
FIG. 2D is a schematic representation of an example of a security transformation device communicatively coupled to a first device, where the security transformation device receives second secure communication.

FIG. 2D illustrates an example system 250 with the secure device 206 sending second secure communication 252 over the second communication connection line 210 to the first device 202. For example, the secure device 206 may obtain a temperature measurement. The secure device 206 may utilize the second key as an encryption key to encrypt the temperature measurement to create the second secure communication 252. The secure device 206 may send the second secure communication 252 over the second communication connection line 210, which may be received by the communication line interface 216 of the security transformation device 212.

Figure 2E:
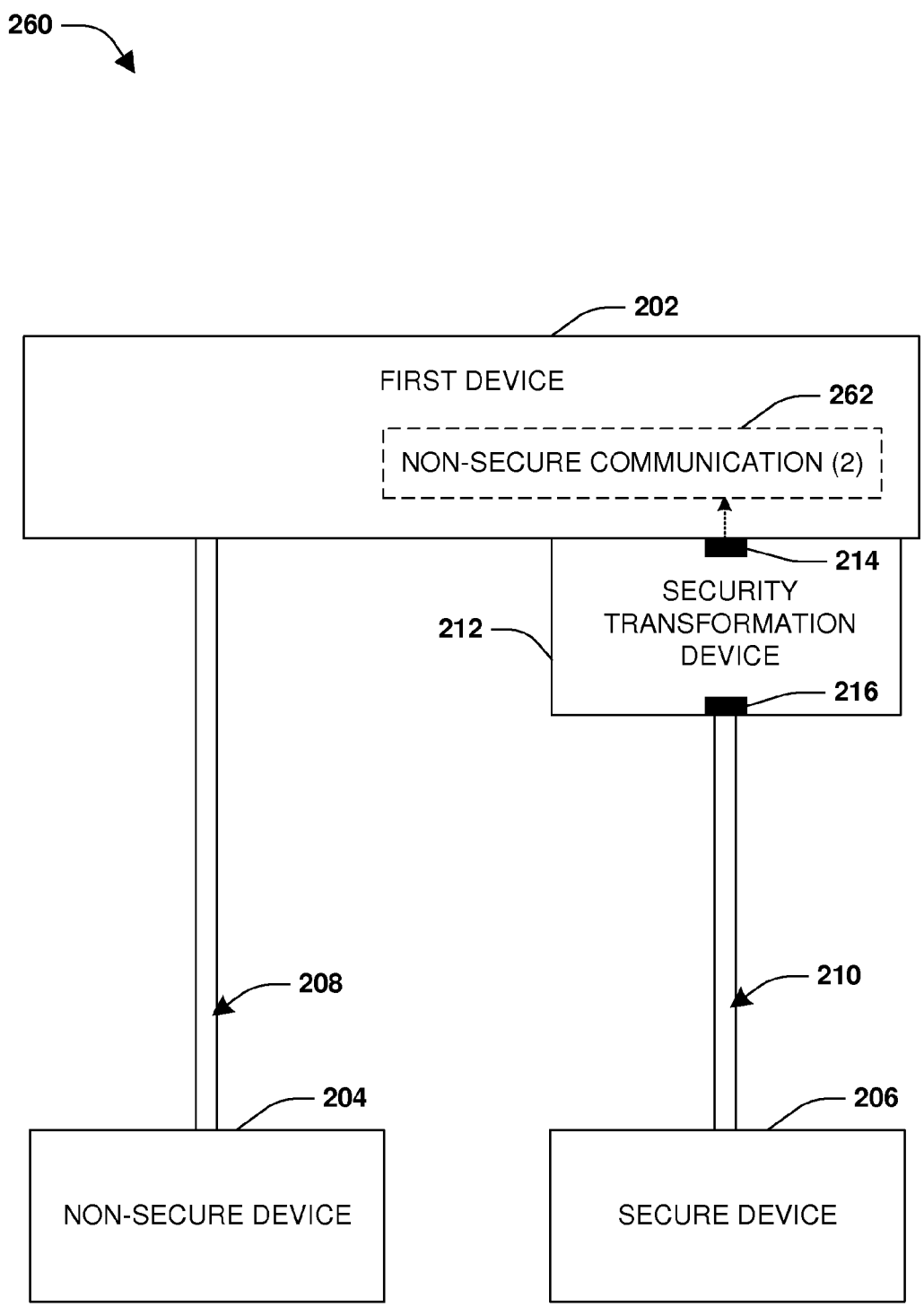
FIG. 2E is a schematic representation of an example of a security transformation device communicatively coupled to a first device, where the security transformation device evaluates second secure communication.

FIG. 2E illustrates an example system 260 with the security transformation device 212 evaluating the second secure communication 252 utilizing security evaluation functionality by either authenticating the second secure communication 252 or failing to authenticate the second secure communication 252. For example, the security transformation device 212 may use the key as a decryption key for attempting to decrypt the second secure communication 252. In an example, the evaluation of the second secure communication 252 may be triggered based upon a threshold number of bytes of the second secure communication 252 being received, which may reduce latency otherwise introduced by the evaluation.

If the decryption is successful, then the second secure communication 252 may be deemed as being authenticated, otherwise, the second secure communication 252 may be deemed as not being authenticated. If the security evaluation functionality fails to authenticate the second secure communication 252, then the security transformation device 212 may refrain from providing the second secure communication 252 to the first device 202. FIG. 2E illustrates the security transformation device 212 successfully authenticating the second secure communication 252 and providing second non-secure communication 262 (e.g., a decrypted version of the second secure communication 252, such as the temperature measurement) to the first device 202 through the first device interface 214.

FIGS. 3A-3G schematically illustrate examples of a system (e.g., 300, 330, 340, 350 360, 370 and/or 380) for securing communication between a first device 302 and a non-secure device 304. It is to be appreciated that for each of FIGS. 3A-3G, the first device 302 may be the distributed control system 122 of FIG. 1, may be a subset of the distributed control system 122 of FIG. 1 or may be a different control system or industrial device such as a field device. Also, the presented system(s) 300, 330, 340, 350 360, 370 and 380 of FIGS. 3A-3G may be the same, similar or different relative to each other. Further, devices (i.e., proper or known devices) presented within the examples shown in FIGS. 3A-3G, may be the devices in FIG. 1 that are part of the industrial plant 102 and/or may be other, non-shown devices.

Figure 3A:
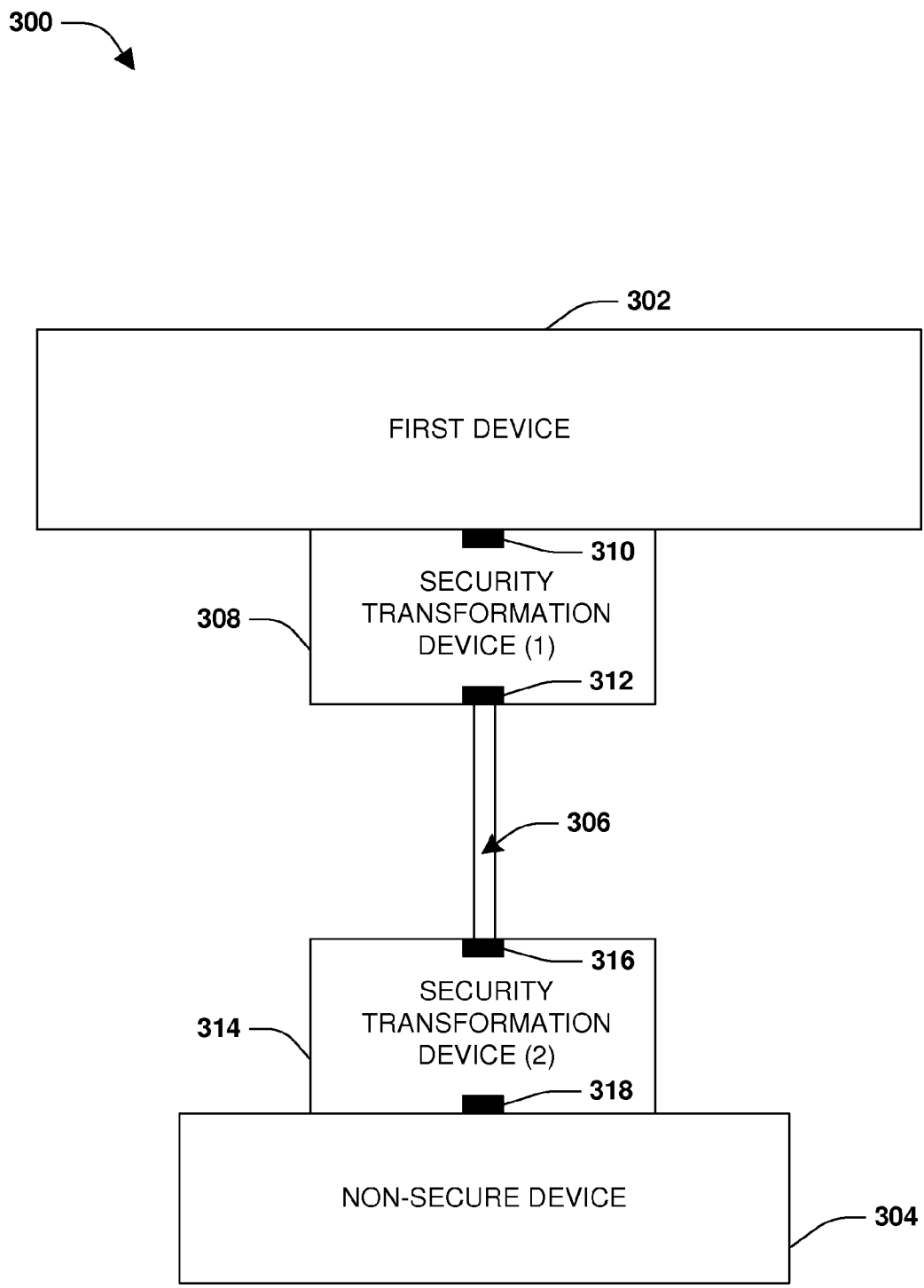
FIG. 3A is a schematic representation of an example of a first security transformation device communicatively coupled to a first device and a second security transformation device communicatively coupled to a non-secure device.

FIG. 3A illustrates an example system 300 with the first device 302 being communicatively coupled (e.g., wired, wireless, etc.) to the non-secure device 304 by a communication connection line 306. The system includes a first security transformation device 308 and a second security transformation device 314. In an example, the first security transformation device 308 or security evaluation functionality thereof may be integrated into the first device 302 (e.g., the first device 302 may implement the security evaluation functionality). The first security transformation device 308 may communicatively couple to the first device 302 by a first device interface 310 and to the communication connection line 306 by a first communication line interface 312. The second security transformation device 314 may communicatively couple to the non-secure device 304 by a second device interface 318 and to the communication connection line 306 by a second communication line interface 316. The first security transformation device 308 (or the first device 302) and the second security transformation device 314 may include security evaluation functionality, such as a signature key used to digitally sign data with a signature and/or used to verify a signature of data. The first and second security transformation devices 308 and 314 can thus each be configured to receive non-secure communication for transmission over the communication connection line 306, transform the non-secure communication into secure communication and send the secure communication to a destination. In this case the destination can be either the first device 302 or the non-secure device 304, dependent upon communication direction.

Figure 3B:
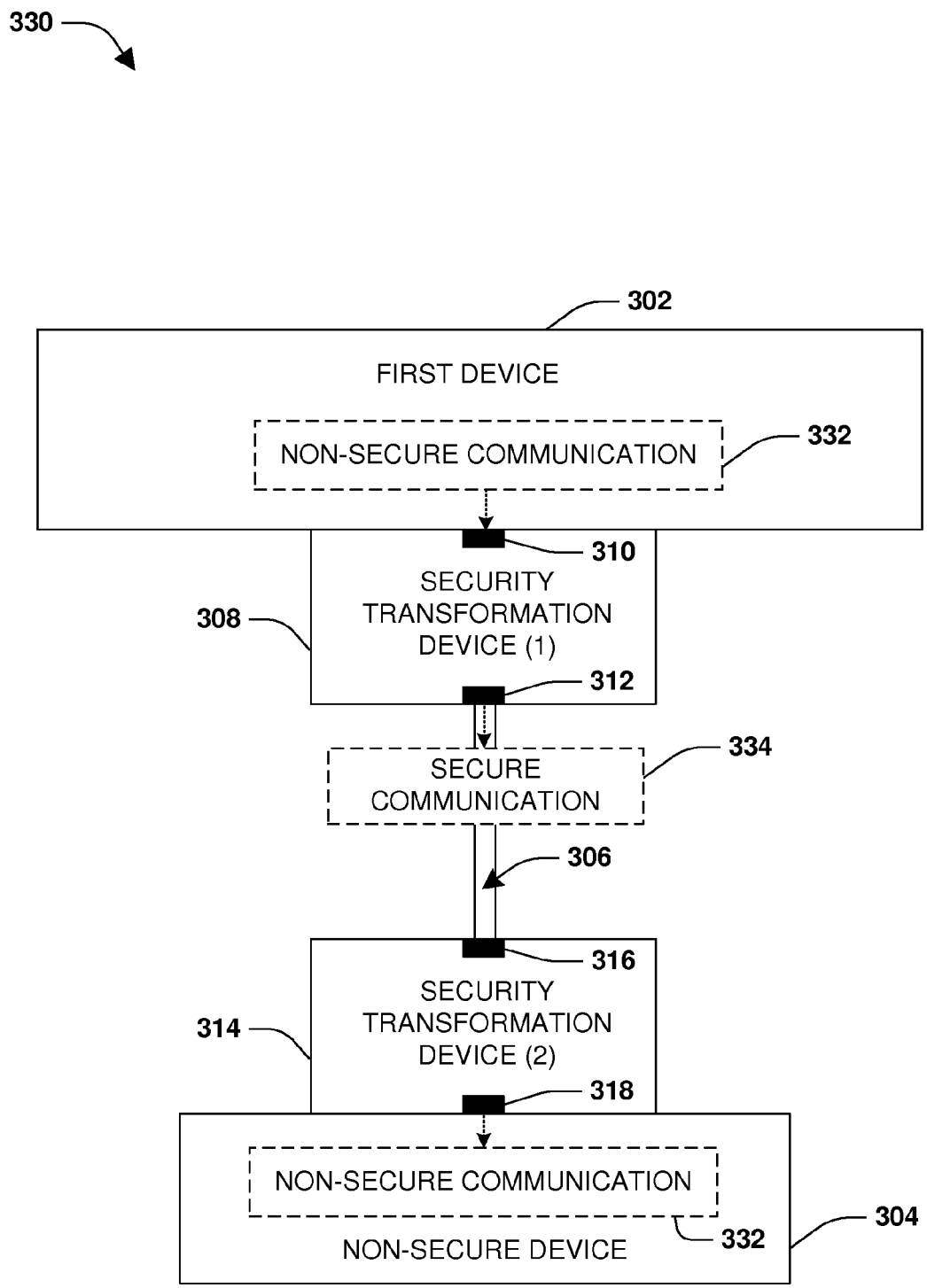
FIG. 3B a schematic representation of is an example of a first security transformation device communicatively coupled to a first device and a second security transformation device communicatively coupled to a non-secure device.

FIG. 3B illustrates an example system 330 for providing secure communication from the first device 302 to the non-secure device 304. For example, the first device 302 may create non-secure communication 332, such as a message instructing the non-secure device 304 to obtain and provide back a pressure measurement. The first security transformation device 308 may receive the non-secure communication 332 over the first device interface 310. The first security transformation device 308 may use the signature key to digitally sign the non-secure communication 332 with a signature to create secure communication 334. The first security transformation device 308 may send the secure communication 334 through the first communication line interface 312 and over the communication connection line 306.

The second security transformation device 314 may receive the secure communication 334 from over the communication connection line 306 and through the second communication line interface 316. The second security transformation device 314 may use the signature key to attempt to verify the signature of the secure communication 334 by either authenticating the secure communication 334 or failing to authenticate the secure communication 334. If the signature verification is successful, then the secure communication 334 may be deemed as being authenticated, otherwise, the secure communication 334 may be deemed as not being authenticated. If the second security transformation device 314 fails to authenticate the secure communication 334, then the second security transformation device 314 may refrain from providing the secure communication 334 to the non-secure device 304. FIG. 3B illustrates the second security transformation device 314 successfully authenticating the secure communication 334 (e.g., successfully verifying the signature using the signature key) and providing the non-secure communication 332 to the non-secure device 304 through the second device interface 318.

Figure 3C:
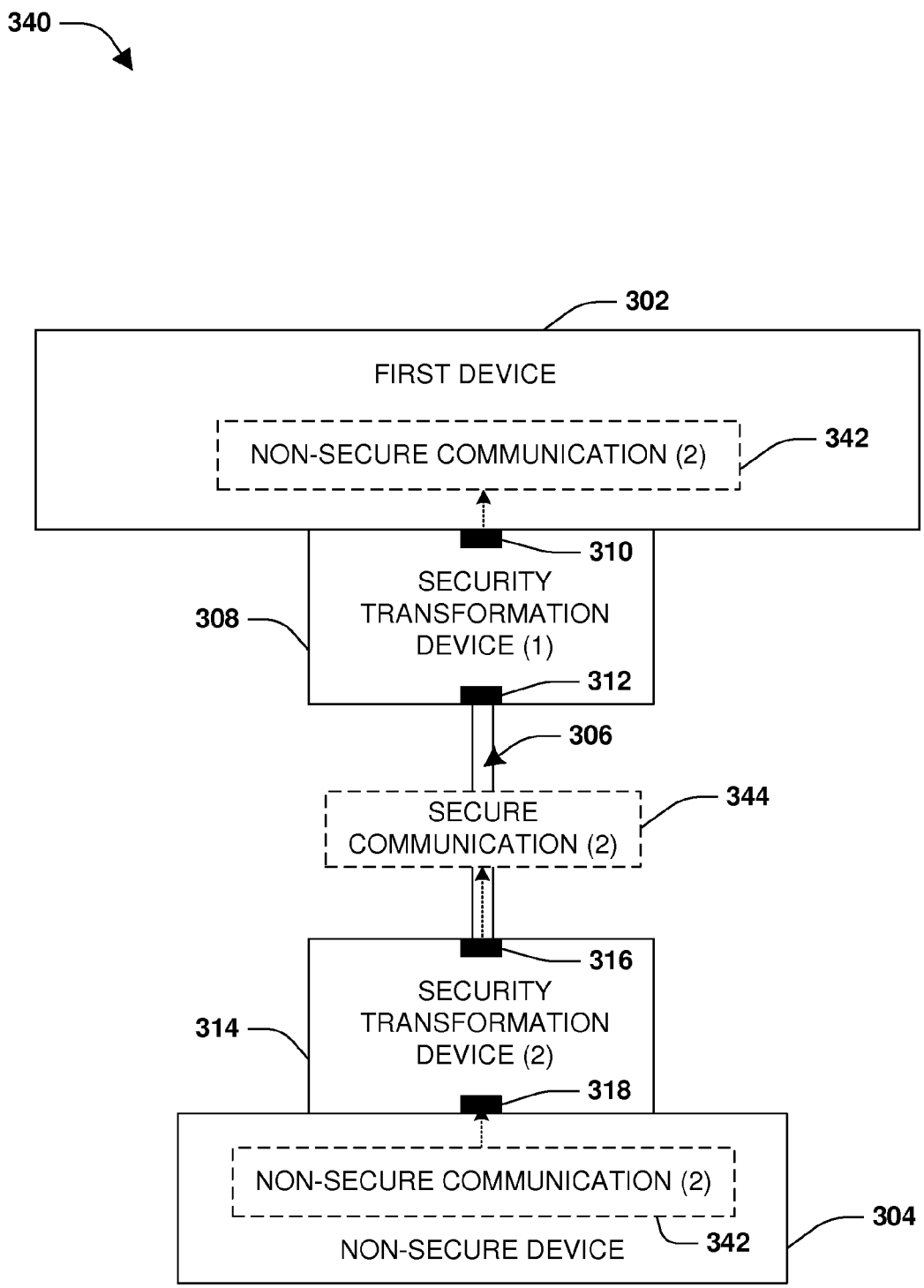
FIG. 3C is a schematic representation of an example of a first security transformation device communicatively coupled to a first device and a second security transformation device communicatively coupled to a non-secure device.

FIG. 3C illustrates an example system 340 for providing secure communication from the non-secure device 304 to the first device 302. For example, the non-secure device 304 may create second non-secure communication 342, such as a response message with a pressure measurement obtained by the non-secure device 304. The second security transformation device 314 may receive the second non-secure communication 342 over the second device interface 318. The second security transformation device 314 may use the signature key to digitally sign the second non-secure communication 342 with a signature to create second secure communication 344. The second security transformation device 314 may send the second secure communication 344 through the second communication line interface 316 and over the communication connection line 306.

The first security transformation device 308 may receive the second secure communication 344 from over the communication connection line 306 and through the first communication line interface 312. The first security transformation device 308 may use the signature key to attempt to verify the signature of the second secure communication 344 by either authenticating the second secure communication 344 or failing to authenticate the second secure communication 344. If the signature verification is successful, then the second secure communication 344 may be deemed as being authenticated, otherwise, the second secure communication 344 may be deemed as not being authenticated. If the first security transformation device 308 fails to authenticate the second secure communication 344, then the first security transformation device 308 may refrain from providing the second secure communication 344 to the first device 302. FIG. 3C illustrates the first security transformation device 308 successfully authenticating the second secure communication 344 (e.g., successfully verifying the signature using the signature key) and providing the non-secure communication 342 to the first device 302 through the first device interface 310.

Figure 3D:
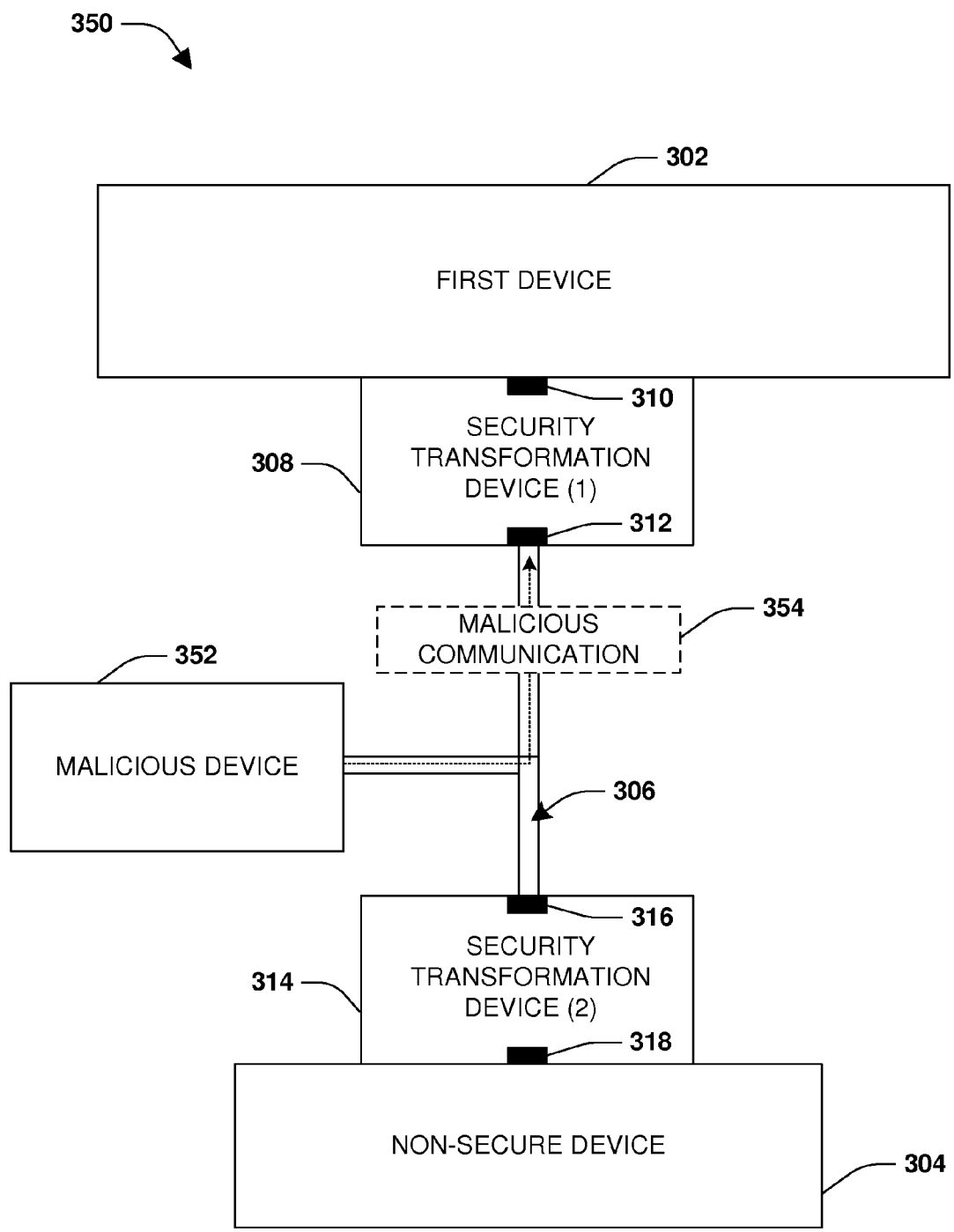
FIG. 3D is a schematic representation of an example of a first security transformation device failing to authenticate malicious communication.

FIG. 3D illustrates an example system 350 with the first security transformation device 308 failing to authenticate malicious communication 354 caused by a malicious device 352, which is not a proper part of the system 350. For example, a malicious person may connect a malicious device 352 to the communication connection line 306. The malicious device 352 may be used to inject the malicious communication 354 onto the communication connection line 306 (e.g., the malicious communication 354 may comprise an erroneous pressure measurement that may trigger the first device 302 to alter normal operation of an industrial plant). Because the malicious device 352 may not have access to the signature key (e.g., or a key used for encryption/decryption, such as the key described in FIGS. 2A-2E), the malicious communication 354 may not be digitally signed by the signature key.

The first security transformation device 308 may receive the malicious communication 354 from over the communication connection line 306 and through the first communication line interface 312. The first security transformation device 308 may use the signature key to evaluate the malicious communication 354 for a signature by either authenticating the malicious communication 354 or failing to authenticate the malicious communication 354. The signature verification will fail because the malicious communication 354 does not comprise the correct signature, and thus the malicious communication 354 may be deemed as not being authenticated. Because the security evaluation functionality fails to authenticate the malicious communication 354, the first security transformation device 308 may refrain from providing the malicious communication 354 to the first device 302 or may modify the malicious communication 354. In an example of modifying the malicious communication 354, the first security transformation device 308 may have triggered the evaluation of the malicious communication 354 using the signature key based upon receiving a threshold number of bytes of the malicious communication 354, which may reduce latency otherwise introduced by the evaluation. Responsive to the first security transformation device 308 failing to authenticate the malicious communication 354 using the signature key, the first security transformation device 308 may modify one or more subsequent bytes of the malicious communication 354, such as to modify data integrity of the malicious communication 354, to create erroneous communication that may fail a checksum evaluation or standard length verification by the first device 302, thus resulting in the first device 302 disregarding the erroneous communication (e.g., the malicious communication 354 may be corrupted so that the corrupted malicious communication 354 is ignored by a destination such as the first device 302).

In an example, the first security transformation device 308 and/or the second security transformation device 314 may identify the malicious device 352 as a new device connected along the communication connection line 306 (e.g., a change in an electrical characteristic along the communication connection line 306, receipt of non-secure communication that fails authentication, etc.). The first security transformation device 308 may provide an alert (e.g., an audible alert, a visual alert, an alert message sent to the first device 302, etc.), shutdown communication associated with the non-secure device 304 and/or the malicious device 352, and/or alter a state of the non-secure device 304 (e.g., set an operating parameter of the non-secure device 304 to a default value so that the malicious device 352 does not set the operating parameter to a malicious value). If communication associated with the non-secure device 304 is shutdown, then the communication may be restarted based upon the second security transformation device 314 receiving a restart communication command (e.g., a restart code). In an example, the malicious communication 354 may be marked as having failed authentication. In this way, failed authentication communication may be counted, analyzed to create failed authentication message statistics, logged, and/or provided to other devices such as a distributed control system or other control system.

Figure 3E:
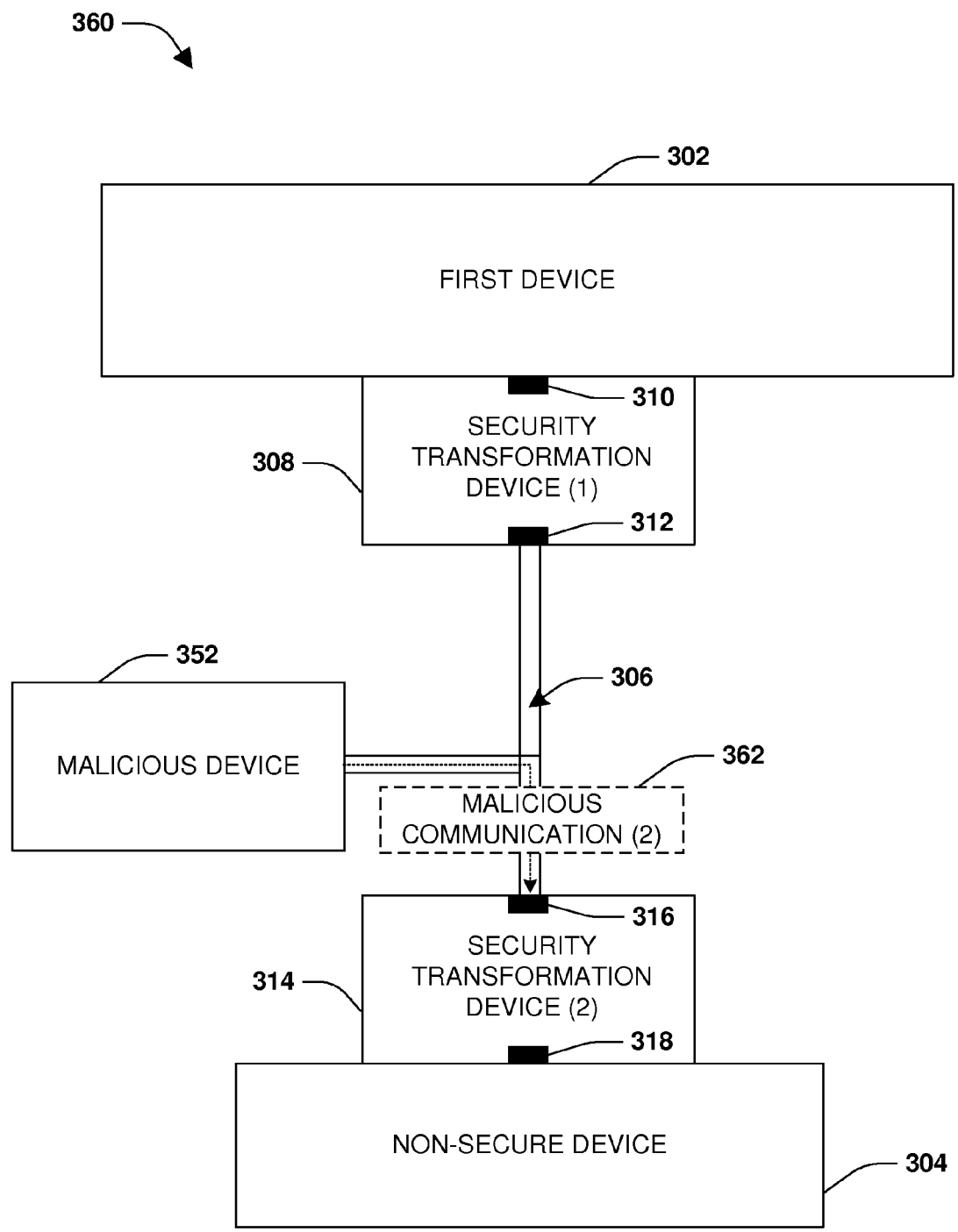
FIG. 3E is a schematic representation of an example of a second security transformation device failing to authenticate second malicious communication.

FIG. 3E illustrates an example system 360 that presents an example of failing to authenticate second malicious communication 362 caused by the malicious device 352, which is not a proper part of the system 360. The malicious device 352 may be used to inject the second malicious communication 362 onto the communication connection line 306 (e.g., the second malicious communication 362 may comprise an erroneous instruction for the non-secure device 304 to close a valve). Because the malicious device 352 may not have access to the signature key (e.g., or a key used for encryption/decryption, such as the key described in FIGS. 2A-2E), the second malicious communication 354 may not be digitally signed by the signature key.

The second security transformation device 314 may receive the second malicious communication 362 from over the communication connection line 306 and through the second communication line interface 316. The second security transformation device 314 may use the signature key to evaluate the second malicious communication 362 for a signature by either authenticating the second malicious communication 362 or failing to authenticate the second malicious communication 362. The signature verification should fail because the second malicious communication 362 does not comprise the signature, and thus the second malicious communication 362 may be deemed as not being authenticated. Because the second security transformation device 314 fails to authenticate the second malicious communication 362, the second security transformation device 314 may refrain from providing the second malicious communication 362 to the non-secure device 304 or may modify the second malicious communication 362 to create erroneous communication that will be disregarded by the non-secure device 304.

Figure 3F:
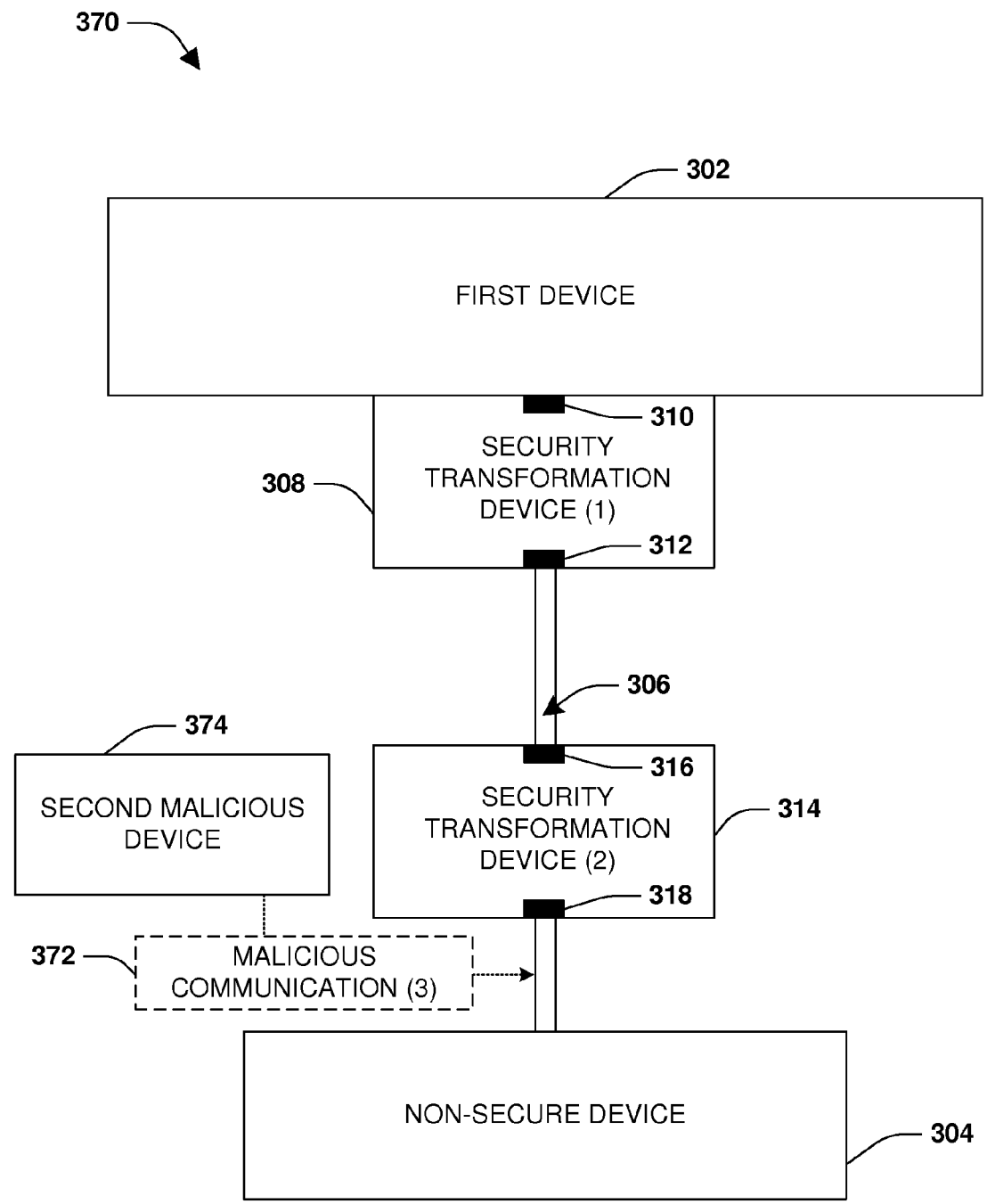
FIG. 3F is a schematic representation of an example of a second security transformation device failing to authenticate third malicious communication.

FIG. 3F illustrates an example system 370 that presents an example of failing to authenticate third malicious communication 372 by a second malicious device 374, which is not a proper part of the system 370. The second malicious device 374 may be connected to a connection, such as a cable (e.g., an open wired connection), between the non-secure device 304 and the second security transformation device 314. The second malicious device 374 may be used to attempt to perform various malicious actions using the third malicious communication 372, such as modifying a configuration setting within the non-secure device 304 so that the non-secure device 304 does not behave as expected, send a malicious message onto the communication connection line 306, etc.

The second security transformation device 314 may monitor the status of the connection, such as the cable, between the non-secure device 304 and the second security transformation device 314. For example, the second security transformation device 314 may detect the second malicious device 374 as a newly connected device, a change in power consumption to the non-secure device 304, a difference in an actual and expected control signal, a change in configuration of the non-secure device 304 (e.g., a status of a flag may indicate whether a configuration setting has been changed), a disconnection of the non-secure device 304, a failure to authenticate the third malicious communication 372, etc. Accordingly, the second security transformation device 314 may take various actions such as disabling the non-secure device 304, sending a notification to the first device 302 (e.g., a control system), remove power to the non-secure device 304, log a record of the suspicious behavior/condition, and/or perform other corrective or alert type actions.

Figure 3G:
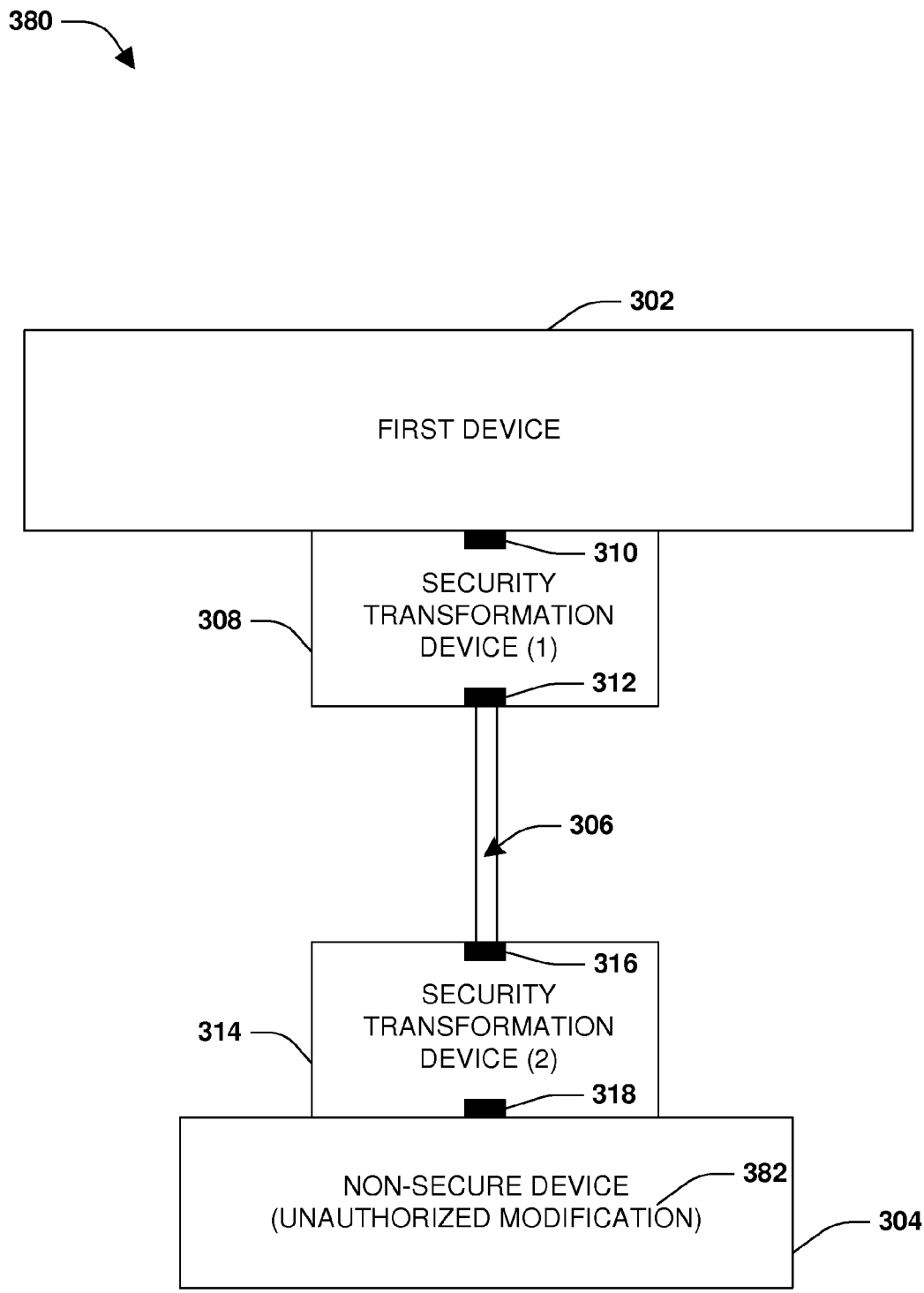
FIG. 3G is a schematic representation of an example of a second security transformation device detecting an unauthorized modification to a non-secure device.

FIG. 3G illustrates an example system 380 that presents an example of detecting unauthorized modification 382 to the non-secure device 304. For example, the second security transformation device 314 may evaluate the non-secure device 304 to determine whether a physical alteration such as the unauthorized modification 382 has occurred to the non-secure device 304. Responsive to determining that the physical alteration has occurred (e.g., a signal, such as a heartbeat signal, from the non-secure device 304 and received by the second security transformation device 314 may be altered by a tamper detection component, such as a communication monitor, of the non-secure device 304 to indicate an occurrence of a physical alteration to the non-secure device 304 such as an opening of an enclosure), an alert may be provided, communication associated with the non-secure device 304 may be shut down, and/or a state of the non-secure device 304 may be altered.

Figure 4A:
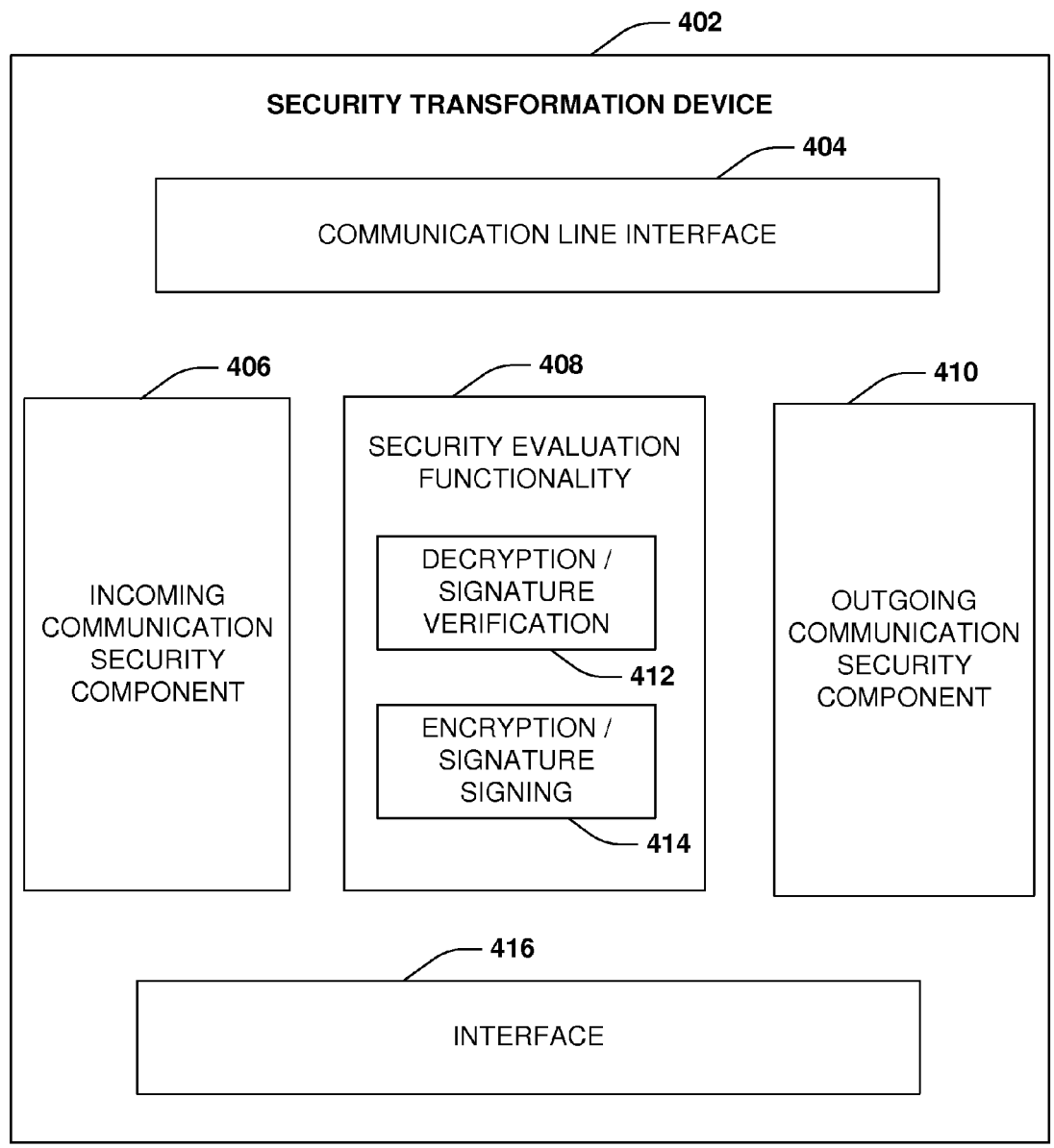
FIG. 4A is a schematic representation of an example of a security transformation device.

FIG. 4A illustrates an example of a security transformation device 402 (other configurations are possible). The security transformation device 402 includes a communication line interface 404 configured to communicatively couple to a communication connection line that communicatively couples a first device to a second device. The security transformation device 402 includes an interface 416 configured to communicatively couple to a non-secure interface of a component, such as the first device or the second device. The security transformation device 402 includes security evaluation functionality 408 used to evaluate communication for authentication. For example, the security evaluation functionality 408 may comprise decryption and/or signature verification functionality 412 used to decrypt and/or verify a signature for authentication purposes. The security evaluation functionality 408 may comprise encryption and/or signature signing functionality 414 used to encrypt and/or digitally sign communication for secure transmission.

The security transformation device 402 can include an incoming communication security component 406. The incoming communication security component 406 may be configured to receive communication, through the communication line interface 404, from over the communication connection line. The incoming communication security component 406 may evaluate the communication utilizing the security evaluation functionality, such as the decryption and/or signature verification functionality 412, by either authenticating the communication or failing to authenticate the communication (e.g., successfully or unsuccessfully decrypting the communication or verifying a signature of the communication). Responsive to authenticating the communication, the communication may be provided over the interface 416 to the component. Responsive to failing to authenticate the communication, the communication may not be provided over the interface 416 to the component.

The security transformation device 402 can include an outgoing communication security component 410. The outgoing communication security component 410 may be configured to receive non-secure communication, through the interface 416, from the component. The outgoing communication security component 410 may transform the non-secure communication into secure communication using the security evaluation functionality 408, such as the encryption and/or signature signing functionality 414 (e.g., the non-secure communication may be encrypted and/or digitally signed). The secure communication may be sent, through the communication line interface 404, over the communication line to a destination.

Figure 4B:
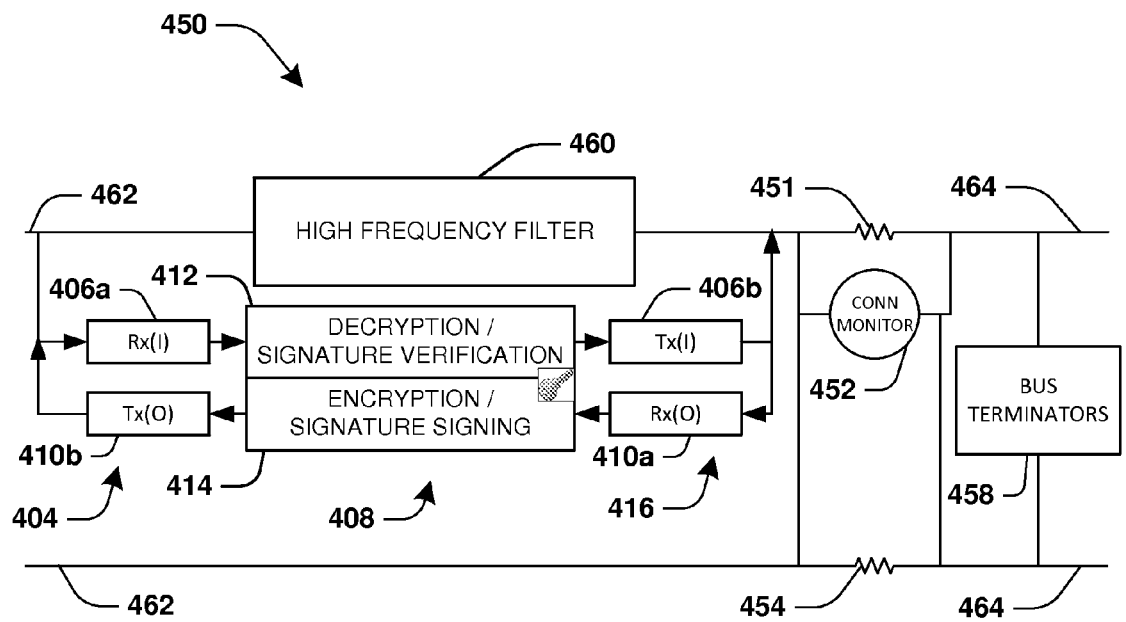
FIG. 4B is a schematic representation of an example of a security transformation device.

FIG. 4B illustrates an example of a security transformation device 450. In an example, the security transformation device 450 may comprise the communication line interface 404 configured to communicatively couple to a secure communication connection line 462 that communicatively couples a first device to a second device. The security transformation device 450 may comprise the interface 416 configured to communicatively couple to a non-secure interface 464 of the second device. For example, the interface 416 may connect to the non-secure interface 464 through a connection monitor 452 (e.g., configured to break a connection to the second device if tampering of a device physical connection to the second device occurs, if a new device is detected on a non-secure side of the physical connection, or if any other condition being monitored occurs. In an example, the connection monitor 452 may be associated with, such as comprising, a first resistor 451, a second resistor 454, and bus terminators 458 (e.g., used to facilitate signal transmission such as high frequency signal transmission over a bus).

The security transformation device 450 may comprise the incoming communication security component 406, such as an incoming signal receiver 406a and an incoming signal transmitter 406b, used to evaluate and provide communication received from over the communication connection line 462 to the second device. The security transformation device 450 may comprise the outgoing communication security component 410, such as an outgoing signal receiver 410a and an outgoing signal transmitter 410b, used to secure communication from the second device for transmission over the communication connection line 462. The security transformation device 450 may comprise the security evaluation functionality 408, such as the decryption and/or signature verification functionality 412 and/or the encryption and/or signature signing functionality 414.

The security transformation device 450 may comprise a high frequency filter 460 configured to filter relatively higher frequency signals, corresponding to communication that is to be received through the incoming signal receiver 406a and/or the outgoing signal receiver 410a for processing by the security evaluation functionality 408, from relatively lower frequency signals corresponding to control signals (or power) that are to be provided to the second device over the non-secure interface 464. In an example, communication, not filtered by the high frequency filter 460, may be received by the incoming signal receiver 406*a* from over the communication connection line 462. The decryption and/or signature verification functionality 412 may evaluate the communication by either authenticating the communication or failing to authenticate the communication. If the communication is authenticated, then the communication can be transmitted by the incoming signal transmitter 406*b* over the interface 416 and the non-secure interface 464 to the second device. If the communication fails to be authenticated, then the communication may not be transmitted to the second device. In another example, non-secure communication, from the second device, may be received by the outgoing signal receiver 410*a* through the interface 416. The encryption and/or signature signing functionality 414 may transform the non-secure communication into secure communication. The secure communication may be sent by the outgoing signal transmitter 410*b* over the communication connection line 462.

Figure 5:
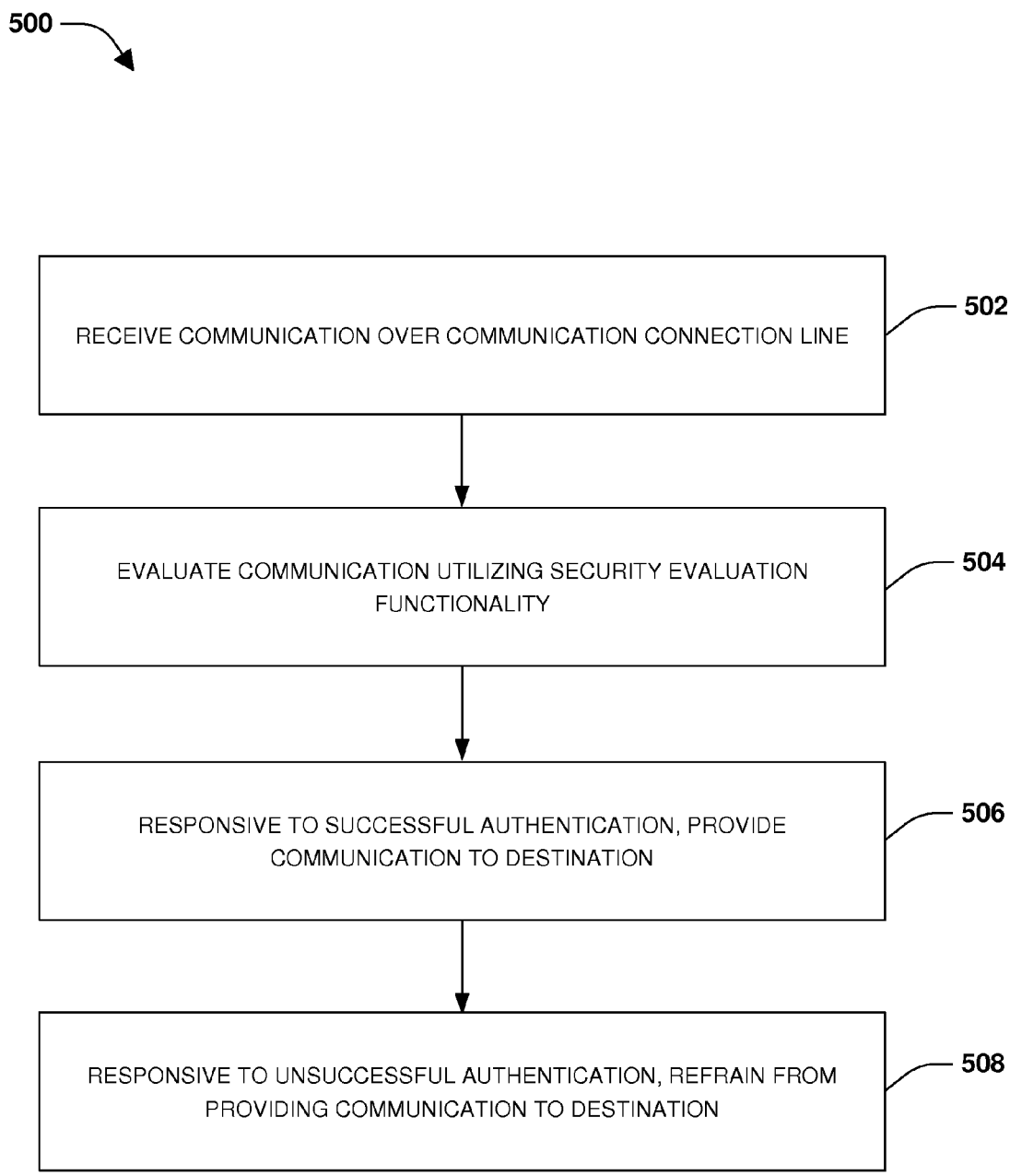
FIG. 5 is a flow chart for an example method of securing communication between a first device and a second device.

FIG. 5 illustrates an example method 500 of securing communication between a first device and a second device. In the example, the method 500 includes a step 502 of receiving communication over a communication connection line that communicatively couples the second device and the first device. The method 500 includes, at step 504, evaluating the communication utilizing security evaluation functionality by either authenticating the communication or failing to authenticate the communication. The method 500 includes, at step 506, responsive to the security evaluation functionality authenticating the communication, providing the communication to a destination, such as the first device or the second device. The method 500 includes, at step 508, responsive to the security evaluation functionality failing to authenticate the communication, refraining from providing the communication to the destination.

The disclosed subject matter has been described with reference to the example embodiments described above. Modifications and alterations will occur to others upon a reading and understanding of this specification. Example embodiments incorporating one or more aspects of the disclosed subject matter are intended to include all such modifications and alterations insofar as they come within the scope of the appended claims.

What is claimed is:

1. A process system comprising:
   a valve assembly;
   a distributed control system communicatively coupled with the valve assembly over a communication connection line; and
   a security transformation device coupled to the communication connection line and interposed between the valve assembly and the distributed control system, the security transformation device having a circuit that,
   receives a communication in a protocol used by the distributed control system to control a valve assembly at a receiver from the communication connection line;
   transforms the communication into an erroneous communication downstream of the receiver; and
   sends the erroneous communication to the communication connection line via a transmitter;
   wherein the circuit evaluates the communication to generate the erroneous communication by,
   failing to authenticate the communication using a signature key that operates to digitally sign data, wherein the erroneous communication corresponds with the absence of the signature key in the communication;
   responsive to failing to authenticate the communication, modifying data integrity of the communication to create the erroneous communication so that the valve assembly is not able to verify a checksum evaluation; and
   provideing the erroneous communication to the communication connection line via the transmitter, and
   wherein responsive to an occurrence of at least one of a threshold number and frequency of failed authentication events, the circuit provides one of an alert, shutdown communication for the valve assembly, or alters a state of the valve assembly.

2. The system of claim 1, wherein the circuit also:
   monitors for at least one of: a new device connection, a power consumption change of at least one of the first device and the second device, a difference of a control signal on the communication connection line, a configuration change of at least one of the first device and the second device, and a disconnect of at least one of the first device and the second device.

3. The system of claim 1, wherein the circuit also:
   encrypts the communication to create a secure communication.

4. The system of claim 1, wherein the circuit also:
   decrypts the communication using a decryption key.

5. The system of claim 1, wherein the circuit also:
   evaluates the valve assembly to determine whether a physical alteration or configuration change has occurred; and
   responsive to determining that the physical alteration has occurred, provides one of the alert, shutdown communication for the valve assembly, or alters the state of the valve assembly.

6. The system of claim 1, wherein the circuit also:
   identifies a new device connected between the security transformation device and the valve assembly; and
   responsive to identifying the new device, provides at least one of the alert, shutdown a communication connection to the valve assembly, shutdown a control signal to the valve assembly, or alters the state of the valve assembly.

7. The system of claim 6, wherein the circuit also:
   restarts communication for the valve assembly based upon receiving a restart communication command.

8. A security transformation device, comprising:
   a circuit with a receiver and a transmitter, the circuit operative to,
   receive communication in a protocol used by a distributed control system to control a valve assembly at the receiver from a communication connection line;
   evaluate the communication by failing to authenticate the communication using a signature key that operates to digitally sign data;
   responsive to failing to authenticate the communication, modify data integrity of the communication to create an erroneous communication so that the valve assembly is not able to verify a checksum evaluation, wherein the erroneous communication corresponds with absence of the signature key in the communication; and
   provide the erroneous communication to the valve assembly via the transmitter,
   wherein responsive to an occurrence of at least one of a threshold number and frequency of failed authentication events, the circuit is further operative to provide one of an alert, shutdown communication for the valve assembly, or alter a state of the valve assembly.

9. The security transformation device of claim 8, wherein the circuit operative to:
evaluate the valve assembly to determine whether a physical alteration has occurred; and
responsive to determining that the physical alteration has occurred, provides one of the alert, shutdown communication for the valve assembly, or alters the state of the valve assembly.

10. The security transformation device of claim 8, wherein the circuit operative to:
identify a new device connected between the circuit and the valve assembly; and
responsive to identifying the new device, provide at least one of the alert, shutdown a communication connection to the valve assembly, shutdown a control signal to the valve assembly, and or alter the state of the valve assembly.

11. The security transformation device of claim 8, wherein the circuit is operative to monitor for power consumption change of the valve assembly.

12. A method for securing communication between a distributed control system and a valve assembly, the method comprising:
receiving communication in a protocol used by the distributed control system to control a valve assembly at a receiver from a communication connection line that communicatively couples a valve assembly with distributed control system;
evaluating the communication by failing to authenticate the communication using a signature key that operates to digitally sign data;
responsive to failing to authenticate the communication, modifying data integrity of the communication to create an erroneous communication so that either the distributed control system or the valve assembly is not able to verify a checksum evaluation, wherein the erroneous communication corresponds with the communication not having the signature key;
providing the erroneous communication to either the distributed control system or the valve assembly; and
responsive to an occurrence of at least one of a threshold number and frequency of failed authentication events, providing one of an alert, shutdown communication for the valve assembly, or alter a state of the valve assembly.

13. The method of claim 12, the method including:
monitoring for power consumption change of the valve assembly.

* * * * *